United States Patent [19]

Stevens

[11] Patent Number: 4,854,390
[45] Date of Patent: Aug. 8, 1989

[54] SAND FIGHTER FOR BED PLANTING

[75] Inventor: Sammy L. Stevens, Lamesa, Tex.

[73] Assignee: Sam Stevens, Inc., Lamesa, Tex.

[21] Appl. No.: 320,287

[22] Filed: Mar. 6, 1989

[51] Int. Cl.⁴ .................. A01B 73/04; A01B 79/00; A01B 39/14; A01B 39/08

[52] U.S. Cl. .................................. 172/1; 172/548; 172/456

[58] Field of Search .............. 172/185, 184, 187, 548, 172/21, 22, 554, 1, 456, 540

[56] References Cited

U.S. PATENT DOCUMENTS

| | | | |
|---|---|---|---|
| 1,912,580 | 6/1933 | Heinemann | 172/554 |
| 2,323,460 | 7/1943 | Domrese | 172/548 |
| 2,664,040 | 12/1953 | Beard | 172/548 |
| 4,094,363 | 6/1978 | McCoomb | 172/548 |
| 4,102,406 | 7/1978 | Orthman | 172/548 |
| 4,383,580 | 5/1983 | Huxford | 172/21 |
| 4,658,910 | 4/1987 | Garriss | 172/548 |

Primary Examiner—Richard J. Johnson
Attorney, Agent, or Firm—Wendell Coffee

[57] ABSTRACT

A plurality of sand fighter rotor units are attached to a folding tool bar upon a tractor. Each rotor unit operates in a furrow between rows of growing crops on top of the beds. Each rotor has four spiders with two distal spiders working on the side of the bed and two medial spiders working near the bottom of the furrow. The prongs of the medial spiders are longer than the prongs of the distal spiders. The prongs of the spiders are arranged to dig less than two divots per square foot.

17 Claims, 2 Drawing Sheets

SAND FIGHTER FOR BED PLANTING

RIGHTS TO INVENTIONS UNDER FEDERAL RESEARCH

There was no federally sponsored research and development concerning this invention.

BACKGROUND OF THE INVENTION (1) Field of the Invention

This invention relates to the agriculture, and more particularly to controlling blowing sand in agricultural fields. Farmers in agricultural areas having problems with blowing sand are persons having ordinary skill in this art.

(2) Description of the Related Art

In certain agricultural areas, there is an agricultural problem with blowing sand. This problem is prevalent in West Texas, Eastern New Mexico, and parts of Oklahoma. The problem arises in the spring when there is very little vegetation growing on the land. This problem is particularly evident when the crops are small, e.g., about 3" high or less. The plants at that stage are not large enough to prevent the sand from blowing, and they are also so tender that they are burnt or otherwise damaged by the blowing sand.

The problem arises only after a heavy rain. When the heavy rain falls upon loose cultivated soil, it classifies the soil. The water mixes with the soil. With the water mixed with the soil, the lighter, smaller particles or the soil rise to the top, and the heavier, coarser particles of soil sink to below the small fine surface particles. Therefore, the surface of the earth is covered with a layer of fine, light sand. When dry winds (generally from the West) blow over the land, they cause the top of the soil to dry out and the sand to blow. The top fraction of an inch will be dry and blowing while the soil below the top crust is moisture laden.

As used herein, by the term "divot", it is meant one pit, poc, or hole in the ground made by a single spike, prong, or small spade of a rotating spider, and also the mound or hill of dirt ejected by it when it is removed from the ground. Applicant recognizes that the dictionary indicates turf is associated with a divot. However, as used herein, there will be no turf associated with the divot, merely coarse moist soil from beneath the upper dry, fine, light sand crust.

Farm implements called "sand fighters" have been developed to control the blowing sand. If a divot one or two square inches of coarse, moist soil are kicked up per square foot of surface area, this will prevent the soil from beginning to blow. Therefore, if a farmer begins fighting the sand on the windward side, he can prevent the sand from blowing. As he works the field from the West to the East (assuming a West wind) he can prevent the sand from blowing. Inasmuch as the sand will destroy the crop within a few hours time, it is necessary for the farmer to cover large amounts of land in a small period of time. For example, often it is desirable to be able to run a sand fighter over 160 acres in two hours time.

It will be apparent that if so much area is to be covered in such a short time, that it is necessary that a very wide swath of land must be worked with every pass of the tractor, and that the tractor must travel at a high speed. Therefore, a sand fighter is very wide and has very little draft. Particularly, sand fighters were designed to have kickers or spiders rotating on an elongated shaft, i.e., if a shaft were pulled behind a tractor, the shaft being at right angles in the direction of draft, and where, e.g., 60' long, that a pipe or a plurality of pipes could be telescoped over the shaft so that the pipe is rotatable upon the shaft. Then, if spiders were spaced about one foot apart, and if each spider had a diameter of about 12", and there were three points on each spider, the points on the spider would be spaced apart about one foot in a circumference. Therefore, as this instrument were rolled along the ground, there would be one divot of fresh coarse, moist soil kicked up for every square foot of land.

As stated above, this met the criteria to prevent the sand from starting to blow; and therefore, would control the blowing sand. It will be apparent that such an implement would be very wide and could normally be pulled at the highest speed the tractor would travel, generally called "road gear". It is interesting to note that, as indicated above, often this operation would be carried on when there was danger of the tractor becoming stuck in the soft soil, and that sometimes on low spots of the field that tended to be muddy, that the tractors would have to be turned and not pass through these areas of the field because of the danger of getting the tractor stuck in the mud.

Often the sand fighters described above will be run at an angle to the rows. I.e., instead of having the tractor follow rows, it would be at an angle to the rows.

The sand fighters described above were developed and perfected to be towed behind a tractor at a time when the crops were generally planted in the furrow, i.e., the land would be bedded with intervening furrows, and the crop would be in the furrow, and the general level of the soil would be higher than the soil in which the crop was growing. However, often times, the soil would be almost level from the rain, if not from cultivation. Also, with only one square inch or so of soil uprooted for every square foot (144 square inches), although some crop was destroyed in the operation, it would be a rather insignificant amount.

At the present time, a majority of the cotton is "bed planted", i.e., the crop is seeded or drilled into the top of the bed rather than into the furrow. Therefore, it is more susceptible to damage from the random cultivation resulting from the traditional sand fighter described above.

SUMMARY OF THE INVENTION (1) Progressive Contribution to the Art

I have invented a sand fighter particularly adapted to fight sand with a bed planted crop. According to my invention, the sand fighter follows the rows of the crop and consists of a series of rotors or gangs, each rotor having four spiders. The rotor works in the furrow and not on top of the bed where the crop was growing. Each rotor has four spiders mounted on a common tube or shaft. Each rotor has two large diameter spiders in the center (medial spiders) and two small diameter spiders on each side (distal spiders). Therefore, when the rotor runs in the furrow between the beds, the small diameter spiders run along the sides of the bed, and the large diameter spiders would run in the bottom of the furrow.

I have had good success of running 17 rotors on one folding tool bar. I.e., are 7 rotors running on a center section and 5 rotors on a wing on each side of the center which could be folded upward for turning the tractor at the end of a row or for when the tractor was being moved from one field to another.

The long spiders are manufactured by having three straps welded to a center shaft. On the large spiders, if each strap were about 10½" long with a bent tip and welded radially from 1⅜" shaft, it may be seen that each spider would extend about 11" from the center of the shaft. Except for the bent tip, the straps would be radially attached to the shaft. Then each of the smaller straps would be about 8" long, and they too have a bent tip.

With 17 such gangs attached to a tool bar and set 40" apart, that they would cover a swath of ground of over 55' with each pass through the field, which is comparable to what has proved sufficient in the past.

Objects of this Invention

An object of this invention is to prevent sand from damaging agricultural fields, and more particularly from destroying young crops.

Another object of this invention is to prevent sand from blowing when crops are planted on top of the beds, without excessive damage to the growing crops.

Further objects are to achieve the above with devices that are sturdy, compact, durable, lightweight, simple, safe, efficient, versatile, ecologically compatible, energy conserving, and reliable, yet inexpensive and easy to manufacture, connect, adjust, operate and maintain. Other objects are to achieve the above with a method that is rapid, versatile, ecologically compatible, energy conserving, efficient, and inexpensive, and does not require skilled people to connect, adjust, operate, and maintain.

The specific nature of the invention, as well as other objects, uses, and advantages thereof, will clearly appear from the following description and from the accompanying drawing, the different views of which are not scale drawings.

Figure 1:
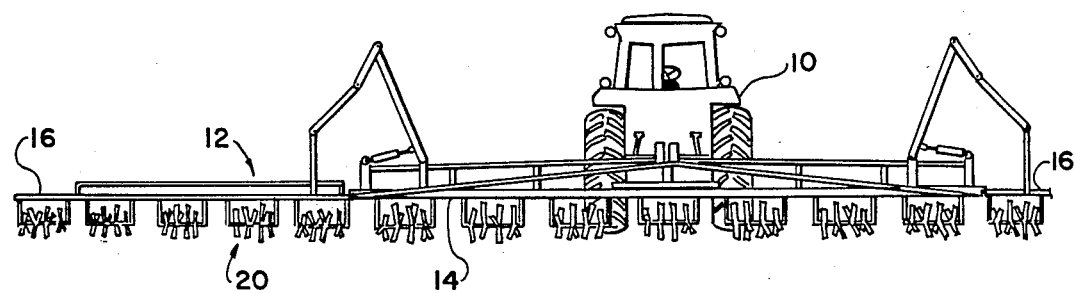
FIG. 1 is a rear elevational view of a tractor with a tool bar with the rotors of spiders thereon, with the tool bar in the unfolded or operating position with one end broken away.

As an aid to correlating the terms of the claims to the exemplary drawing, the following catalog of elements and steps is provided:

10 tractor
12 tool bar
14 center section
16 folding wings
20 rotor units
22 axle
24 clamp
26 legs
28 bearing
30 distal spiders
32 medial spiders
34 distal prongs
36 medial prongs
38 foot
40 distal brace
42 medial brace
44 bend point
T direction of travel
R direction of rotation

DESCRIPTION OF THE PREFERRED EMBODIMENT

Figure 2:
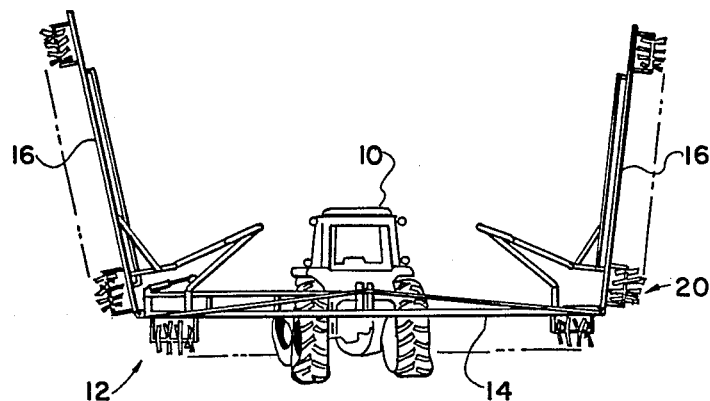
FIG. 2 is a rear elevational view similar to FIG. 1 with the tool bar in the folded position for traveling.

Referring to the drawings, there may be seen tractor 10 having tool bar 12 attached thereto. The tool bar has a center section 14 and two folding wings 16. FIG. 1 shows the wings in the extended position, while FIG. 2 shows them in the upright or folded position for traveling.

Those with skill in the art will understand that tool bars with folding wings are well known to the art; and therefore, they are not further described here.

When the tool bar 12 is extended, it may be seen that there are seven rotor units 20 attached to the center section 14. Each wing has five rotor units 20 for a total of 17 units. If the units are set for 40" rows, the total width of the unit is over 56'.

Legs 26 are attached to the tool bar 12 in pairs. Each leg has a clamp 24 at its upper end to clamp the leg 26 to the tool bar.

Each rotor unit 20 includes axle 22. The axle 22 is mounted on each end for rotation in bearing 28. Preferably, one of the bearings 28 is mounted upon the bottom or lower end of each of the legs 24 and a solid axle 22 is journaled within each of the bearings.

Those familiar with sand fighters and the prior art will understand that in some instances, a less expensive unit could be made by having individual spiders 30 and 32 welded to a pipe and the pipe journaled over a solid round steel bar. Obviously, for s longer life, a bearing is preferred. However, it is possible to have unit having a shorter life, but much lower initial cost by eliminating the more sophisticated bearings.

Four spiders 30 and 32 are attached to the axle 22 of each rotor unit 20. The spiders are designated as distal spiders 30 which are on the ends of the axle near the bearings, and medial spiders 32 which are between the distal spiders. Each distal spider has three distal prongs 34, and each medial spider has three medial prongs 36. All of the medial prongs have the same prong length, and all of the distal prongs have the same prong length. The medial prongs will have about a three inch greater prong length than the distal prongs. I prefer to have the medial prongs have a prong length of about 11" as measured from the horizontal axis of the axle 22, and the distal prongs have a prong length of about 8" as measured from the axis of the axle 22.

Figure 4:
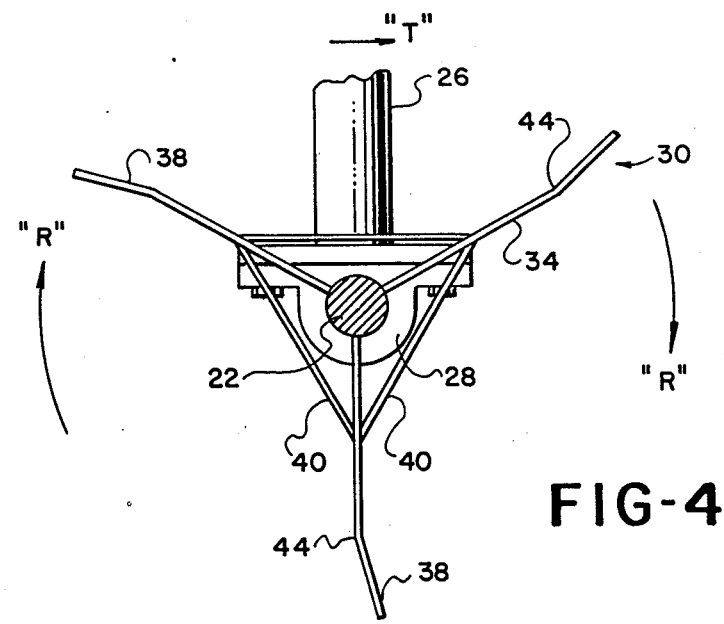
FIG. 4 is a cross sectional view taken substantially on line 4—4 of FIG. 3 showing a small distal spider.
Figure 5:
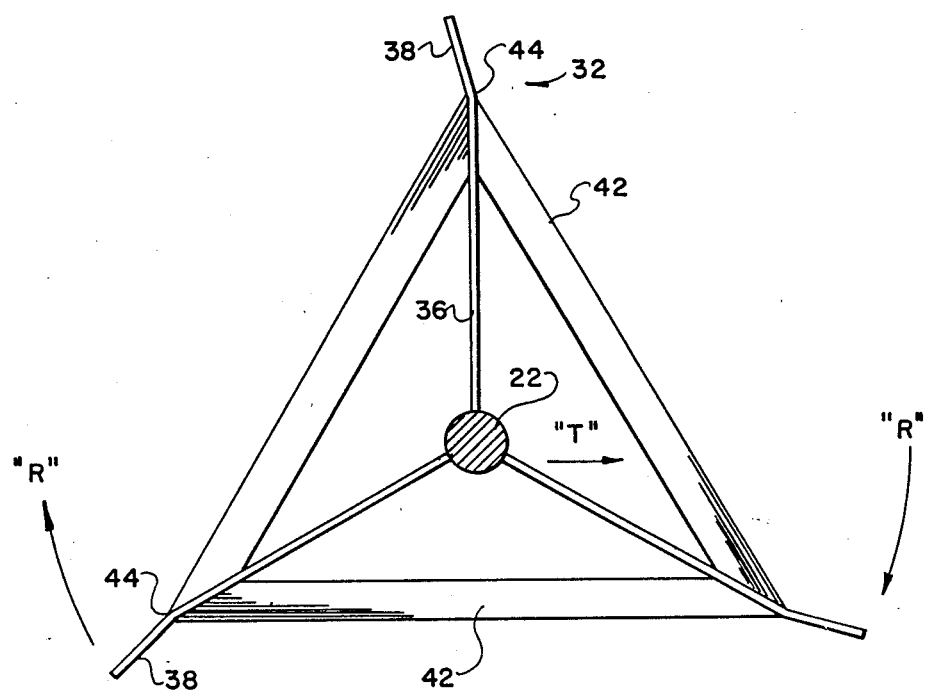
FIG. 5 is a cross sectional view taken substantially on line 5—5 of FIG. 3 showing a large medial spider.

Each of the prongs, both the distal prongs 34 and medial prongs 36, will be bent at bending point 44 near the periphery thereof. Each prong is bent in the same direction as seen in the drawing of FIG. 4 and FIG. 5. The drawings show the direction of travel of the tool bar 12 by arrow "T" and the direction of rotor 20 rotation by arrow "R". The prongs are mounted on the tool bar in such a way that in operation, the flat bent end or foot 38 strikes the ground as it rolls along the ground in a flat position. Therefore, when it leaves the ground or emerges from the ground, it will more emerge along more nearly at a right angle to the surface of the earth than if it were straight or bent in the opposite direction. It may be seen that the foot striking the ground flatly could also be described that the bent extremity points forward when the prong extends downward.

As discussed above, the sand fighter is operated over the field at higher speed than any other earth working equipment. Having the prongs leave the earth at an angle which is more nearly at right angles to the surface of the earth prevents them from kicking up as much dirt as otherwise. If the prongs were bent in the opposite direction, they would throw loose dirt very widely. However, by having the prongs bent so that the foot 38 strikes the ground flatly and emerges from the ground close to a right angle, causes more of a divot to be turned up by each prong. i.e., there will be a small pit or hole in the ground with a small hill or mound of dirt adjacent to the pit. This is desirable for prevent the sand from blowing.

Figure 3:
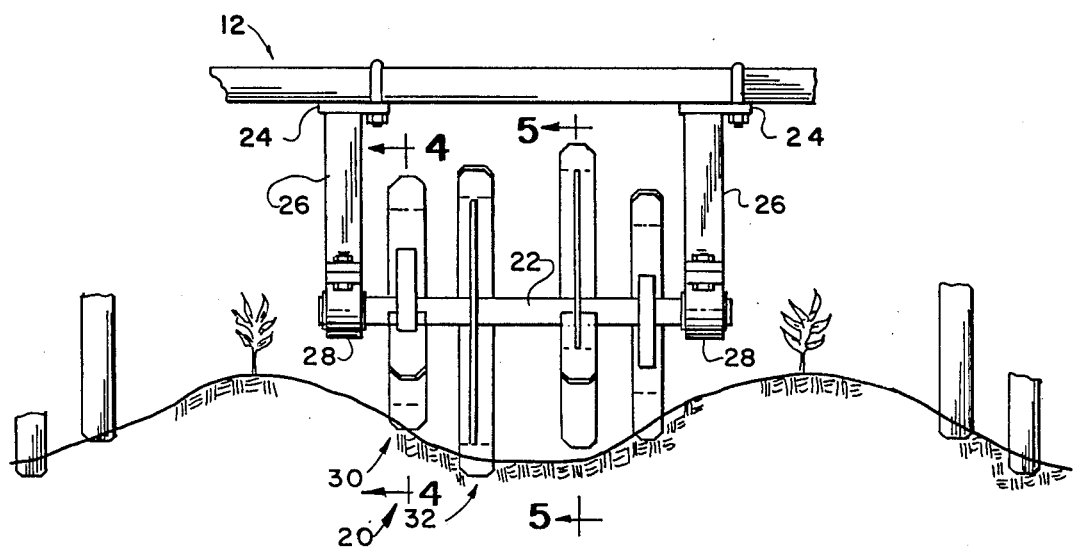
FIG. 3 is a rear elevational view of one gang shown engaged with the soil in the furrow between two beds.

As seen in FIG. 3, the rotor unit is designed to work in the furrow along the sides of the bed. Each of the prongs 34 and 36 are designed to form divots. However, as seen in FIG. 3, the shorter distal prongs 34 operate of soil that is at a higher elevation, and the medial prongs 36 work more in the bottom of the furrow. The soil at the bottom of the furrow will be more firm and fully packed than the soil along the side of the bed. Therefore, the medial prongs are made from a heavier metal. I.e., the thickness of the metal which are used to make the medial prongs is thicker than the metal used to make the distal prongs.

Each of the spiders 30 and 32 have braces 40 and 42 between the prongs. The braces are made by flat straps or flat bars of metal. It may be seen from FIG. 4, that with the distal spider 30, that three distal braces 40 are used for each spider. The distal braces 40 extend from one distal prong 34 to an adjacent prong. The distal braces 40 are attached closer to the axle 20 than to the top of the prong 34. Also, it may be seen that the braces 40 for the distal prongs 34 are in a tangential plane.

In FIG. 5, the medial braces 42 between the prongs are also flat bars. However, in this case, they will be in a diametrical plane. Also, the medial braces 42 will extend from the bend point 44 of one medial prong 36 to near the bend point of an adjacent prong.

In operation, it may be seen that as the rotor units 20 are attached to the tool bar 12, that they will be attached at the clamps 24. The axle 22 will have a length of about 26 inches. Therefore, if the crop is planted on top of the bed at about 40" row spacing, there will be a 7" space between the leg 26 and the growing crop. The distal spiders are spaced about 20 inches apart on the axle 22. I find it desirable to have at least 6" between the divots formed by the distal spiders and the growing crop. Also, the distal prongs are about 3" shorter than the medial prongs so that they will fit the normal contour of the furrowed ground when the rotor unit is run between the crop rows. Also, it may be seen that there will be no more than two divots per square foot of area of the furrow inside the bed. I.e., if the furrow inside the bed is taken from the distance from one distal spider to the next, there will be about less than two divots per square foot. Also, it may be seen by simple calculation that the distance between the bed is about 65% of the total soil surface of the field.

Therefore, it may be seen that I have provided a sand fighter particularly adapted to prevent sand blowing, yet avoiding any cultivation close to the growing crop.

The embodiment shown and described above is only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. The method of fighting sand in a furrowed field having a crop growing upon the top of the beds comprising:
   a. forming divots in the furrows and on the side of the beds between the growing crops,
   b. said divots on the side of the bed being at least about 6" from the growing crop,
   c. said divots being not more than about 2 divots per square foot of the area of the furrow inside of the bed wherein the divots are made, which is approximately 65% of the total area of the field.

2. A sand fighter rotor comprising:
   a. an axle having a horizontal axis,
   b. four spiders attached to said axle, arranged as two distal spiders and two medial spiders,
   c. each spider having three flat prongs thereon, extending radially outward, each spider in a diametrical plane,
   d. each prong bent at the peripheral extremity in the same direction,
   e. all of the medial prongs on the medial spiders having the same medial prong length,
   f. all of the distal prongs on the distal spiders having the same distal prong length, and
   g. the medial prong length greater than the distal prong length.

3. The invention as defined in claim 2, further comprising:
   h. said spiders so arranged and connected that the bent extremity points forward when the prong extends downward.

4. The invention as defined in claim 2, further comprising:
   h. said axle having a length of about 26".

5. The invention as defined in claim 2, further comprising:
   h. the distance between the distal spiders being about 20".

6. The invention as defined in claim 2, further comprising:
   h. each spider having three braces, one brace extending from one prong to an adjacent prong.

7. The invention as defined in claim 6, further comprising:
   i. said braces of said medial spiders being flat bars,
   j. the flat medial braces being in a diametrical plane, and
   k. said braces for said distal spiders being flat bars, and
   l. said flat distal bars being on a tangential plane.

8. The invention as defined in claim 2, further comprising:
   h. said prongs of the medial spiders being about 3" longer than the prongs of the distal spiders.

9. The invention as defined in claim 2, further comprising:
   h. a pair of legs, i. the axle of said sand fighter rotor defined above journaled for rotation between the pair of legs at the bottom thereof, and j. a clamp at the top of each of the pair of legs for attachment to a tool bar.

10. The invention as defined in claim 9, further comprising:

k. a tool bar, l. means for folding the end portions of the tool bar up, and m. said legs attached to said tool bar.

11. The invention as defined in claim 10, further comprising:

n. a tractor, o. said tool bar connected to said tractor, p. said tractor located in a field having a growing crop planted in rows with a row spacing between the plants, q. said sand fighter rotors connected to said tool bar spaced apart a distance so that the center of one rotor to the center of the next rotor is equal to the row spacing.

12. The invention as defined in claim 11, further comprising:

r. said spiders so arranged and connected that the bent extremity points forward when the prong extends downward.

13. The invention as defined in claim 12, further comprising:

s. said axle having a length of about 26".

14. The invention as defined in claim 13, further comprising:

t. the distance between the distal spiders being about 20".

15. The invention as defined in claim 13, further comprising:

u. each spider having three braces, one brace extending from one prong to an adjacent prong.

16. A sand fighter comprising:

a. a tractor, b. said tractor located in a furrowed field having a growing crop planted in beds in rows with a row spacing between the plants, c. a tool bar connected to said tractor, d. means for folding the end portions of the tool bar up, e. a plurality of legs arranged in pairs, f. a clamp at the top of each leg attaching it to said tool bar, g. a horizontal axle journaled for rotation between the legs of each pair at the bottom thereof, h. each of said axles having an axle length of about 26", i. said pairs of legs connected to said tool bar spaced apart a distance so that the center of each axle to the center of the next axle is equal to the row spacing, j. four spiders attached to each axle, arranged as two distal spiders and two medial spiders, k. each spider in a radial plane, l. the distance between the distal spiders being about 20", m. each spider having three flat prongs thereon, n. the prongs extending radially outward, o. each of said prongs bent at the peripheral extremity in the same direction, p. the bent extremity of each prong pointing forward when the prong extends downward, q. all of the medial prongs on the medial spiders having the same medial prong length, r. all of the distal prongs on the distal spiders having the same distal prong length, s. the medial prongs being about 3" inches longer than the distal prongs, t. each spider having three braces, u. the braces on the medial spiders being flat bars, v. the flat medial braces being in the diametrical plane, w. said flat medial braces extending from about the bent point on one prong to about the bent point on the adjacent prong, x. said braces for the distal spiders being flat bars, y. said flat bars being on a tangential plane, and z. said flat bars for the distal spiders being connected to the prongs closer to the axle than to the tips of the prongs.

17. The invention as defined in claim 16, further comprising:

aa. there being about 17 axles attached to said tool bar.

* * * * *